United States Patent Office 2,772,206
Patented Nov. 27, 1956

2,772,206

PRODUCTION OF FERMENTATION GLYCEROL

Edward M. Frankel, New York, N. Y., and Samuel L. Goldheim, Baltimore, Md.

No Drawing. Application November 9, 1953,
Serial No. 391,111

15 Claims. (Cl. 195—38)

This invention relates to the manufacture of glycerol (glycerin); and in particular to a novel process for the recovery of glycerol which has been made by fermentation of carbohydrates.

That glycerol can be produced from carbohydrates by fermentation is well known. Of the many methods proposed for steering the fermentation towards the production of more glycerol and less alcohol, two have been regarded as most worth while. In one method, the acidity is adjusted so as to maintain a pH of 6.5 to 7.5, in which case about 15 percent of the sugar fermented is converted into glycerol and the rest to acetic acid, ethanol and carbon dioxide. In the other method, the fermentation is carried out in the presence of alkali- or alkaline-earth sulphites and/or bisulphites, in which case 25 to 30 percent of the sugar fermented is converted to glycerol, about 20 percent to ethanol, and about 10 percent to acetaldehyde and the rest to carbon dioxide.

However, these methods have not been commercially successful because of the difficulties of separating the glycerol from the fermentation mixtures. Among the means for so recovering the glycerol, the following have been used: evaporation, salting-out, chemical precipitation, liquid-liquid extraction, distillation. In general, it has been necessary partially to purify the fermentation mixture (by extraction, for example) before effecting final purification by distillation.

The present invention provides a process which can be applied directly to the fermentation mixture in certain cases, or to the partially purified glycerol in other cases.

In principle, this new process consists in fermenting carbohydrate in the presence of sodium sulphite-bisulphite mixture and then (after fermentation is complete) removing the sodium ion by cationic exchange resin, and also recovering the released sulphur dioxide from the sulphurous acid remaining. This sulphur dioxide can then be used for regeneration of the exchange resin and is recovered in the form of sodium bisulphite solution which can be recycled to a succeeding fermentation. The salts are thus separated from the glycerol solution which may then be evaporated to a glycerol concentrate sufficiently pure for some purposes or capable of being distilled to a very pure glycerol for general use.

Among the advantages of this process are that:

(1) The relatively inexpensive cation exchangers can be used;

(2) The glycerol is not exposed to high temperatures or alkaline solutions in the presence of salts and, hence, suffers less damage due to oxidation, charring and polymerization;

(3) The sodium sulphite-bisulphite is recovered in good yield for reuse in subsequent fermentations;

(4) Relatively little process material is discarded so that the process is largely self-contained and does not require extensive provisions for disposal of waste materials.

Since molasses is the cheapest form of fermentable sugar normally available, it has traditionally been used as a prime source of carbohydrate. A representative blackstrap molasses may contain 52 percent sugar, 8 percent inorganic solids, 20 percent non-sugar organic material (such as poly-sugars, proteins, etc.), and 20 percent water. If such a molasses is fermented in the presence of sodium sulphite-bisulphite, the resulting glycerol mixture can be evaporated to distill off the ethanol and acetaldehyde and then extracted with an appropriate solvent. The recovered extract, after removing the solvent by distillation, will contain substantially all of the glycerol and some inorganic and organic solids. It may then be treated by the novel process here described for further purification of the glycerol.

In the preferred method of this invention, the raw material is a purer carbohydrate characterized by low concentrations of non-sugar solids. By using such a higher purity raw material, recovery of the glycerol can be effectuated without employing solvents, etc., by means of the present invention. The higher cost of the original carbohydrate is thus more than offset by the lesser cost of recovery of the glycerol and by its recovery in greater yield.

Thus, a typical source of carbohydrate is raw sugar, a short ton of which contains about 1930 pounds of sugar, 10 pounds of non-sugar solids and 60 pounds of water. This raw sugar is available not only in industrial countries but also in relatively remote regions where the raw sugar is manufactured. This process can easily be made an adjunct of a sugar central which comprises much of the equipment needed and which is idle for a part of the year.

In the investigations which led to the present invention it was found that when such high purity raw sugars are fermented with yeast in the presence of sodium sulphite-bisulphite mixture, there are obtained yields of glycerol (based on the sugar fermented) of 25 to 30%. Furthermore, by successive additions of sugar, it is possible to build up to as much as 10 percent of glycerol in the final fermentation mixture. After fermentation is complete, the mixture is centrifuged to remove the yeast cells (which can be returned to the next fermentation) and a relatively clear liquid is obtained.

We have discovered that when this clarified solution is passed directly through a cationic exchange resin, the cation is removed. The effluent then contains glycerol, ethanol, acetaldehyde and sulfurous acid. By fractional evaporation the ethanol, acetaldyhyde and sulfur dioxide are obtained in pure condition, leaving a glycerol concentrate of relatively high purity.

Alternatively, the ethanol and acetaldehyde may be recovered prior to cationic exchange. In this modification of the process the clarified fermentation solution is made slightly alkaline (pH 9), as for example with sodium carbonate, and evaporated to about one-half volume in which case the ethanol and acetaldehyde are substantially removed and may be recovered. The concentrate containing glycerol and sodium sulfite is then passed through a cationic exchange resin and the cation is removed. The effluent containing glycerol and sulfurous acid is evaporated to recover the sulfur dioxide, leaving a concentrate of glycerol of relatively high purity.

We have found that while any of the cationic exchangers can be used, those of the carboxylic type being preferred because they lend themselves to regeneration by sulfurous acid.

In both of the above described procedures within this invention the reclaimed sulfur dioxide gas is redissolved in water and passed through the exchange resin to regenerate it. In this way the sodium ion is reclaimed from the resin, leaving the resin in condition for the next cycle. The effluent consists of sodium bisulphite solution which may then be reused in a subsequent fermentation.

In the above regeneration procedure, it is preferable, though not essential, to perform the regeneration with sulphur dioxide solution under pressure. If it is desired to use excess sulphur dioxide to provide more complete regeneration of the exchange resin, the excess sodium bisulphite and sulfurous acid may be precipitated as an insoluble sulphite (calcium, zinc, etc.) and the sulfur dioxide reclaimed from this precipitate by treatment with an appropriate acid or by heating. Alternatively, the regeneration may be completed by another acid such as sulfuric.

The glycerol concentrate obtained by this process may be used as obtained or may be further purified by conventional ion exchange over cation and anion exchangers or over mixed bed exchangers. Chemical purification with alkaline earth oxides or carbonates involving the precipitation and removal by filtration of insoluble alkaline earth salts, may also be used. Distillation of the glycerol may also be used or any combination of the above methods.

If the fermentation liquid, the beer after clarification contains dissolved or combined carbon dioxide, it may be desirable to decarbonate the beer by appropriate acidification. This can be accomplished by adding a portion of the effluent from the decationizing column. By such processing of the beer it becomes possible to obviate release of carbon dioxide during the decationizing.

The following is an example illustration of this invention.

EXAMPLE

Starting with a solution containing 2000 grams of sugar and 1200 grams of mixed sodium sulfite-bisulfite in 10 liters of solution, at a pH of 7.5, yeast was added and and fermentation proceeded. During the first 70 hours, the pH fell to 7.1, then rose above pH 7.5 and was kept at or about pH 7.5 by additions of an appropriate acid, sulfurous acid by choice.

As the sugar fermented, an additional 2000 grams of sugar was added in increments. At the end of 350 hours the sugar content had fallen to 100 grams. A total of 3900 grams of sugar had thus been fermented. A total weight of yeast equal to about 5% of the sugar was used.

The final solution contained 1200 grams of glycerin in 10 liters (12 kilograms) or 10% by weight. The yield of glycerin was 30.8% based on the sugar fermented. Also present was acetaldehyde to the extent of 30% of the glycerin content. With fermentations in open vessels over relatively long periods (as was the case in these runs), considerable ethanol was lost by evaporation; as a result, the ethanol content of the final solution was only 10% of the glycerin.

This fermentation mixture was purified as follows:

A 30" bed depth of 1370 ml. of cation exchange resin (polystyrene carboxylic acid) in the fully regenerated hydrogen form was prepared in a column in the usual way. The fermentation mixture (clarified by centrifuging) was passed down flow through this column at room temperature and the effluent collected in 100 ml. portions for analysis. The analyses indicated that the deionization of 860 ml. fermentation mixture was practically complete when 1400 ml. effluent was removed. Final traces were removed by washing, resulting in a total of 2173 ml. of effluent.

The final total effluent was evaporated at atmospheric pressure to recover the sulfur dioxide and acetaldehyde. In view of the factors affecting the ethanol (as mentioned above), no attempt was made to follow the ethanol content.

Tabulation of decationizing procedure and evaporation

| | Influent Clarified fermentation mixture (Beer) | Effluent solution | Effluent after evaporation |
|---|---|---|---|
| Volume (ml.) | 860 | 2,173 | |
| Weight (gram) | 1,000 | | 130 |
| Glycerin content (g.) | 109 | 107 | 100 |
| Ash Content [1] (g.) | 120 | 8 | 8 |
| pH | 8.0 | 0.6 | |
| Acetaldehyde (g.) | 35 | 36 | |

[1] Ash weighed as $Na_2SO_4$.

It will be noted that (within the limits of experimental and analytical error) starting with a solution containing approximately 11% glycerin and 12% residue after ignition, there is obtained a purified glycerin crude containing 77% glycerin and 6% residue after ignition. Thus, 93% of the inorganic content of the fermentation mixture was removed. At the same time, 92% of the glycerin and substantially all of the sulfur dioxide and acetaldehyde were recovered.

It will be understood that the foregoing description of the invention is merely illustrative of the principles thereof; and, accordingly, that the appended claims are to be construed as defining the invention within the full spirit and scope thereof.

We claim:

1. Method of manufacturing glycerol by fermentation which comprises fermenting an aqueous sugar solution with yeast in the presence of sodium sulphite-bisulphite, separating the yeast cells from the fermentation liquid, evaporating ethanol and acetaldehyde from the yeast-freed liquid to obtain a residual solution containing glycerol and sodium sulphite, passing said solution through a cationic exchanger thereby to obtain an effluent containing glycerol and sulphurous acid, heating said effluent to drive off sulphur dioxide thereby to obtain a solution of glycerol of high purity.

2. Method of manufacturing glycerol by fermentation which comprises fermenting an aqueous sugar solution with yeast in the presence of sodium sulphite-bisulphite, separating the yeast cells from the fermented liquid, evaporating ethanol and acetaldehyde from the yeast-freed liquid at a pH of about 9 to obtain a residual solution containing glycerol and sodium sulphite, passing said solution through a cationic exchanger thereby to obtain an effluent containing glycerol and sulphurous acid, heating said effluent to drive off sulphur dioxide thereby to obtain a solution of glycerol of high purity.

3. Method of manufacturing glycerol by fermentation which comprises fermenting an aqueous sugar solution with yeast in the presence of sodium sulphite-bisulphite, separating the yeast cells from the fermented liquid, evaporating the ethanol and acetaldehyde from the yeast-freed mass to obtain a residual solution containing glycerol and sodium sulphite, passing said solution through a cationic exchange resin thereby to obtain an effluent containing glycerol and sulphurous acid, heating said effluent to drive off sulphur dioxide thereby to obtain a solution of glycerol of high purity.

4. Method of manufacturing glycerol by fermentation which comprises fermenting an aqueous sugar solution with yeast in the presence of sodium sulphite-bisulphite, separating the yeast cell from the fermented liquid, evaporating the ethanol and acetaldehyde from the yeast-freed mass to obtain a residual solution containing glycerol and sodium sulphite, passing said solution through a carboxylic type cationic exchange resin thereby to obtain an effluent containing glycerol and sulphurous acid, heating said effluent to drive off sulphur dioxide thereby to obtain a solution of glycerol of high purity.

5. Method of manufacturing glycerol by fermentation which comprises fermenting an aqueous solution of high-purity raw sugar with yeast in the presence of sodium sulphite-bisulphite, separating the yeast cells from the fermentation liquid, evaporating ethanol and acetaldehyde from the yeast-freed liquid to obtain a residual solution containing glycerol and sodium sulphite, passing said solution through a cationic exchanger thereby to obtain an effluent containing glycerol and sulphurous acid, heating said effluent to drive off sulphur dioxide thereby to obtain a solution of glycerol of high purity.

6. Method of manufacturing glycerol by fermentation which comprises fermenting an aqueous solution of high-purity raw sugar with yeast in the presence of sodium sulphite-bisulphite, separating the yeast cells from the fermented liquid, evaporating ethanol and acetaldehyde from the yeast-freed liquid at a pH of about 9 to obtain a residual solution containing glycerol and sodium sulphite, passing said solution through a cationic exchanger thereby to obtain an effluent containing glycerol and sulphurous acid, heating said effluent to drive off sulphur dioxide thereby to obtain a solution of glycerol of high purity.

7. Method of manufacturing glycerol by fermentation which comprises fermenting an aqueous solution of high-purity raw sugar with yeast in the presence of sodium sulphite-bisulphite, separating the yeast cells from the fermentation liquid, evaporating ethanol and acetaldehyde from the yeast-freed liquid to obtain a residual solution containing glycerol and sodium sulphite, passing said solution through a cationic exchange resin thereby to obtain an effluent containing glycerol and sulphurous acid, heating said effluent to drive off sulphur dioxide thereby to obtain a solution of glycerol of high purity.

8. Method of manufacturing glycerol by fermentation which comprises fermenting an aqueous solution of high-purity raw sugar with yeast in the presence of sodium sulphite-bisulphite, separating the yeast cells from the fermentation liquid, evaporating ethanol and acetaldehyde from the yeast-freed liquid to obtain a residual solution containing glycerol and sodium sulphite, passing said solution through a carboxylic type cationic exchange resin thereby to obtain an effluent containing glycerol and sulphurous acid, heating said effluent to drive off sulphur dioxide thereby to obtain a solution of glycerol of high purity.

9. Method of manufacturing glycerol by fermentation which comprises fermenting an aqueous solution of high-purity raw sugar with yeast in the presence of sodium sulphite-bisulphite, separating the yeast cells from the fermented liquid, evaporating ethanol and acetaldehyde from the yeast-freed liquid at a pH of about 9 to obtain a residual solution containing glycerol and sodium sulphite, passing said solution through a cationic exchange resin thereby to obtain an effluent containing glycerol and sulphurous acid, heating said effluent to drive off sulphur dioxide thereby to obtain a solution of glycerol of high purity.

10. Method of manufacturing glycerol by fermentation which comprises fermenting an aqueous solution of high-purity raw sugar with yeast in the presence of sodium sulphite-bisulphite, separating the yeast cells from the fermented liquid, evaporating ethanol and acetaldehyde from the yeast-freed liquid at a pH of about 9 to obtain a residual solution containing glycerol and sodium sulphite, passing said solution through a carboxylic type cationic exchange resin thereby to obtain an effluent containing glycerol and sulphurous acid, heating said effluent to drive off sulphur dioxide thereby to obtain a solution of glycerol of high purity.

11. In a method of purifying a solution comprising essentially glycerol and sodium bisulphite, the step of passing said solution through a bed of cation exchange material in acid form thereby to obtain an effluent containing glycerol and sulphurous acid, heating said effluent to drive off sulphur dioxide thereby to obtain a solution of glycerol of high purity.

12. In a method of purifying a solution comprising essentially glycerol and sodium bisulphite, the step of passing said solution through a cationic exchange resin thereby to obtain an effluent containing glycerol and sulphurous acid, heating said effluent to drive off sulphur dioxide thereby to obtain a solution of glycerol of high purity.

13. In a method of purifying a solution comprising essentially glycerol and sodium bisulphite, the step of passing said solution through a carboxylic type cationic exchange resin thereby to obtain an effluent containing glycerol and sulphurous acid, heating said effluent to drive off sulphur dioxide thereby to obtain a solution of glycerol of high purity.

14. Method of manufacturing glycerol by fermentation which comprises fermenting an aqueous sugar solution with yeast in the presence of sodium sulphite-bisulphite, separating the yeast cells from the fermentation liquid, to obtain a clarified beer, passing said clarified beer through a cationic exchanger thereby to obtain an effluent containing glycerol and sulphurous acid, and acetaldehyde and ethanol and fractionally evaporating said effluent to recover separately the acetaldehyde, the ethanol and sulphur dioxide and obtain a residual solution of glycerol of high purity.

15. Method in accordance with claims 1 or 14 including the step of acidifying the clarified beer with effluent from the cationic exchanger.

References Cited in the file of this patent

UNITED STATES PATENTS

| | | |
|---|---|---|
| 1,425,838 | Cocking | Aug. 15, 1922 |
| 2,410,518 | Neuberg | Nov. 5, 1946 |
| 2,478,417 | Mnookin | Aug. 9, 1949 |
| 2,571,210 | Craver | Oct. 16, 1951 |

OTHER REFERENCES

Duchenne, J. O.: Proc. 16th Ann Congress of South African Sugar Technologists Assn., 1942, pages 45–47 (1 p. excerpt).

Nachod: Ion Exchange, 1949, Academic Press Inc., New York, page 372.

Kunin et al.: Ion Exchange Resins, 1950, pages 55 to 58.